United States Patent [19]

Kitahara et al.

[11] Patent Number: 4,664,841
[45] Date of Patent: May 12, 1987

[54] FINE PARTICLE SUBSTANCE-CONTAINING NON-AQUEOUS DISPERSIONS

[75] Inventors: Ayao Kitahara, Narashino; Kijiro Konno, Tokyo, both of Japan

[73] Assignee: Ricoh Co., Ltd., Tokyo, Japan

[21] Appl. No.: 666,403

[22] Filed: Oct. 30, 1984

Related U.S. Application Data

[63] Continuation-in-part of Ser. No. 349,949, Feb. 18, 1982, abandoned.

[30] Foreign Application Priority Data

Feb. 27, 1981 [JP] Japan .................................. 56-28987

[51] Int. Cl.⁴ ........................ B01J 13/00; G03G 9/00
[52] U.S. Cl. ..................... 252/309; 252/62.56; 252/62.52; 430/116
[58] Field of Search ........... 252/309, 308, 62.52, 252/62.56; 430/114, 115, 116, 106, 107, 108

[56] References Cited

U.S. PATENT DOCUMENTS

| | | | |
|---|---|---|---|
| 2,483,886 | 10/1949 | Crouch | 252/309 X |
| 2,671,758 | 3/1954 | Vinograd | 252/309 X |
| 3,399,145 | 8/1968 | Martinek et al. | 252/309 |
| 3,409,560 | 11/1968 | Faust | 252/309 |
| 3,489,690 | 1/1970 | Lachampt et al. | 252/308 |
| 3,663,475 | 5/1972 | Figiel | 252/309 |
| 3,676,342 | 7/1972 | Gathman et al. | 252/309 X |
| 3,710,510 | 1/1973 | Tully et al. | 252/316 X |
| 3,725,298 | 4/1973 | Woodhead et al. | 252/62.52 X |
| 3,764,540 | 10/1973 | Khallafalla et al. | 252/62.55 |
| 3,867,296 | 2/1975 | Hunt | 252/309 X |
| 3,891,572 | 6/1975 | Moody | 252/309 X |
| 3,948,866 | 4/1976 | Pennewiss et al. | 252/9 X |
| 3,981,844 | 9/1976 | Romankiw | 252/62.52 |
| 3,981,996 | 9/1976 | Leigh | 424/243 |
| 4,073,743 | 2/1978 | Midler, Jr. et al. | 252/309 |
| 4,315,827 | 2/1982 | Bottenberg | 252/62.51 |
| 4,356,098 | 10/1982 | Chagnon | 252/309 X |
| 4,410,446 | 10/1983 | Cheng et al. | 252/309 |
| 4,416,751 | 11/1983 | Berkowitz et al. | 252/309 X |

FOREIGN PATENT DOCUMENTS

| | | | |
|---|---|---|---|
| 705050 | 3/1954 | United Kingdom | 252/62.52 |
| 1468815 | 3/1977 | United Kingdom | |
| 649657 | 2/1979 | U.S.S.R. | 252/62.52 |

Primary Examiner—John F. Terapane
Assistant Examiner—Catherine S. Kilby
Attorney, Agent, or Firm—Flynn, Thiel, Boutell & Tanis

[57] ABSTRACT

A non-aqueous dispersion in which fine particles having an oil-soluble surface active agent adsorbed or adhered thereon are dispersed in a non-aqueous organic solvent.

6 Claims, 1 Drawing Figure

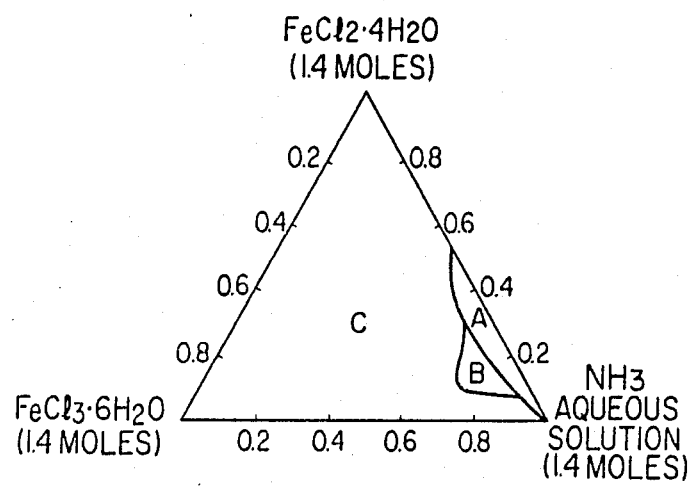

FINE PARTICLE SUBSTANCE-CONTAINING NON-AQUEOUS DISPERSIONS

This application is a continuation-in-part of U.S. Ser. No. 349,949, filed Feb. 18, 1982 and now abandoned.

BACKGROUND OF THE INVENTION

1. Field of the Invention

The present invention relates to a non-aqueous dispersion containing fine particles, in particular a non-aqueous dispersion obtained by coating said fine particles with an oil-soluble surface active agent or making the fine particles adsorb or adhere thereon an oil-soluble surface active agent and dispersing such fine particles in a water-insoluble organic solvent. In this connection, it is to be noted that the fine particles referred to herein are particles having a mean particle diameter of 1000 Å or less, especially 300 Å or less.

2. Description of the Prior Art

As representative non-aqueous dispersions containing fine particles, there can be enumerated (1) electrophotographic liquid developers obtained by coating pigment particles with a resin and dispersing them in a carrier liquid, and (2) gravure inks obtained by coating pigment particles with a resin and dispersing them in an organic solvent and the like. Recently, however, the study of magnetic fluids has been promoted and many investigations have been carried out for developing new uses of magnetic fluids.

The magnetic fluid referred to herein means a liquid highly magnetic substance obtained by dispersing super fine particles of a magnetic substance having a particle diameter of about 100 Å stably in a solvent, said substance being provided with both fluid and highly magnetic characteristics.

The conventional process of producing this magnetic fluid, however, involves problems to be solved such as (i) the production cost is high, (ii) the products have great differences, from lot to lot, in respect of dispersed particle diameter, dispersion stability, viscosity and magnetic characteristics, and further (iii) the dispersion stability per se is not good.

The reasons for the above (i) and (ii) seem to be attributable to the fact that there are many manufacturing steps and control of each step is complicated and difficult. In addition, as the reason for the above (iii) there can be enumerated the fact that the hereinafter-described steps (a) and (b) of the conventional process employed for dispersing highly magnetic oxide particles in the water-insoluble organic solvent are defective. In more detail, in the step (a), which comprises flushing the highly magnetic oxide particles obtained by the wet process in the water-insoluble organic solvent, there is required a proper solid-liquid separating operation before flushing in the case of preparing a dispersion in which the highly magnetic oxide particles are especially super fine ones having particle diameters of 300 Å or less, and further the filtering separation or centrifugal separation employed therein is inferior in efficiency. Consequently, the step (a) requires a treating step for improving the separating efficiency which in turn deteriorates the dispersion stability. In the step (b), on the other hand, grinding is effected by means of a ball mill, attriter or the like but the grinding efficiency is extremely inferior, whereby a long period of time, such as several weeks, is required and additionally it is extremely difficult to reduce the dispersed phase to a particle diameter of 1000 Å or less, especially 300 Å or less. In addition to these defects, the conventional process is also defective in that it is not adapted for the mass production of the above-mentioned magnetic fluid on an industrial scale.

For the purpose of eliminating these defects, a novel process for the production of magnetic fluid has been proposed in Japanese Laid Open Patent Application Nos. 13995/1976 and 65182/1979. Although these processes are each directed to a magnetic fluid using a non-aqueous organic solvent as the dispersion medium, they involve a number of manufacturing steps. Accordingly, the problems, such as production cost, dispersion stability and the like, are not solved. Furthermore, as the dispersion stability is not necessarily superior, the dispersoid dispersed in the water-insoluble organic solvent grows to have a considerably large dimension immediately after it is prepared and after time has passed. To sum up, the above-proposed processes may be said to be disadvantageous in that they cannot produce the dispersoid in the very fine particle form as is intended by the inventors of the present invention.

SUMMARY OF THE INVENTION

It is an object of the present invention to provide a non-aqueous dispersion containing fine particles and which is capable of eliminating the above-mentioned defects or disadvantages. It is another object of the present invention to provide a non-aqueous dispersion, in which the dispersoid having a particle diameter of 1000 Å or less, especially 300 Å or less, is dispersed stably. It is still another object of the present invention to provide a non-aqueous dispersion containing fine particles which can be produced by using simple manufacturing steps and accordingly at a reduced cost and further can be mass produced on an industrial scale.

In other words, the non-aqueous dispersion according to the present invention is characterized by the feature that fine particles having an oil-soluble surface active agent adsorbed or adhered thereon are dispersed stably in a water-insoluble organic solvent.

BRIEF DESCRIPTION OF THE DRAWING

The accompanying drawing is a constitutional diagram illustrating the formation of iron oxide (magnetite) caused by a reaction between ferrous salt and ferric salt in the presence of alkali. In this constitutional diagram, A denotes $Fe_3O_4$, B denotes $\alpha\text{-}Fe_2O_3 \cdot Fe_3O_4$, and C denotes $\alpha\text{-}FeOOH$.

DETAILED DESCRIPTION OF THE PREFERRED EMBODIMENT OF THE INVENTION

The non-aqueous dispersion containing fine particles, according to the present invention, will be described in more detail hereinafter. The dispersoid used in the present invention is a fine particle substance having an oil-soluble surface active agent adsorbed or adhered thereon and having a particle diameter of 1000 Å or less, in particular 300 Å or less, while the dispersion medium used in the present invention is a water-insoluble organic solvent.

As the fine particles which are the nuclei of the dispersoid, there can be enumerated (a) magnetic particles such as nickel, cobalt, ferrite as well as magnetite, (b) pigment particles such as titanium oxide, barium sulfate, calcium carbonate and magnesium carbonate, (c) particles of a latex type high molecular substance, for instance, such as polyacrylamide, polyacrylic acid or its salt, and (d) dye particles. Of course, the above-mentioned fine particles are merely some of the exemplary ones. The dispersions comprising two or more of the same or different kinds of fine particles are within the scope of the present invention.

On the other hand, the dispersoid used in the present invention desirably contains 1 mole or more, preferably about 10 to 50 moles, of water per mole of the oil-soluble surface active agent, although the amount of water is variable depending on the kind of the fine particle that is used.

The typical oil-soluble surface active agents used herein include those having the following general formulas or their similar compounds:

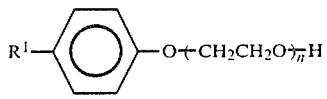 (1)

(wherein $R^1$ represents an alkyl group containing 1 to 20, preferably 6 to 20, carbon atoms. n is an integer of 1 to 20, preferably 6 to 10.), $$R^1O-(CH_2CH_2O)_{n'}H \quad (2)$$

(wherein $R^1$ is the same as defined in the general formula (1). n' is an integer of 1 to 20, preferably 4 to 10.),

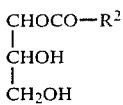 (3)

(wherein $R^2$ represents an alkyl group containing 8 to 20 carbon atoms), $$R^3CO-(CH_2CH_2O)_nOH \quad (4)$$

(wherein $R^3$ represents an alkyl group containing 4 to 20, preferably 8 to 18 carbon atoms. n is the same as defined in the general formula (1).),

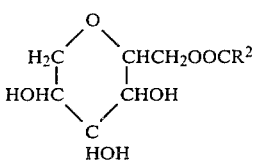 (5)

(wherein $R^2$ is the same as defined in the general formula (3).),

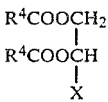 (6)

(wherein $R^4$ represents an alkyl group containing 1 to 30, preferably 4 to 8 carbon atoms. And, X represents $SO_3Na$, $OSO_3Na$, $COONa$, $SO_3K$, $SO_4K$ or $COOK$.),

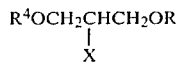 (7)

(wherein $R^4$ and X are the same as defined in the general formula (6).),

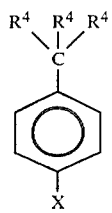 (8)

(wherein $R^4$ and X are the same as defined in the general formula (6).),

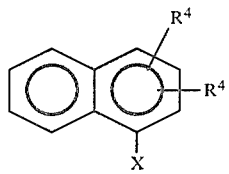 (9)

(wherein $R^4$ and X are the same as defined in the general formula (6).),

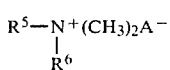 (10)

(wherein $R^5$ is alkyl having 3 to 18 carbon atoms, $R^6$ is alkyl having 10 to 18 carbon atoms, and A is halogen), and

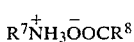 (11)

(wherein $R^7$ is alkyl containing 8 to 20 carbon atoms, and $R^8$ is alkyl containing 1 to 8 carbon atoms).

These oil-soluble surface active agents (or the compounds similar to these oil-soluble surface active agents) may be used singly, or two or more of said agents (or compounds) may be used in combination.

On the other hand, as the water-insoluble organic solvent, namely the dispersion medium, there may be used a variety of solvents, the representative ones thereof including petroleum hydrocarbons such as kerosine and Isopar H (a product of ESSO Standard Oil Co.); other hydrocarbons such as hexane, octane, cyclopentane, benzene, toluene and xylene; halogenated hydrocarbons such as carbon tetrachloride, trichloroethylene, tetrachloroethane and dichlorobenzene; ethers such as diethyl ether and isopropyl ether; esters such as ethyl acetate, propyl acetate, and phenyl acetate; and alcohols such as octyl alcohol, nonyl alcohol, decyl alcohol and benzyl alcohol. In the cases of these dispersion media, the water-insoluble organic solvent may also be used singly or in a combination of two or more of them.

The dispersion according to the present invention, as is seen from the above, is one in which the fine particles having the oil-soluble surface active agent adsorbed or adhered therein, and preferably containing a very small quantity of water, are dispersed in the water-insoluble organic solvent with extreme stability. The solid concentration of this dispersion, which varies somewhat depending on the raw material used for the fine particles per se, is in the range of 35% by weight or less, preferably 7 to 20% by weight.

It is specially preferred to provide a stable, lyophobic, solid-in-liquid, colloidal dispersion (sol) in which the dispersed phase consists essentially of magnetite ($Fe_3O_4$) particles having at least one dimension in the range of from about 10 Angstrom units to about 1 micrometer, preferably in the range from about 30 to about 100 Angstrom units. The magnetite particles have substantially regular, uniform, particle shapes and usually are of substantially spherical shape. The magnetite particles are essentially monodisperse particles, that is, they are of substantially uniform size, and they are uniformly dispersed in the dispersion medium. The magnetite particles are not aggregated bundles of magnetite particles formed by coagulation of primary particles, but rather, they are separate and discrete primary particles.

The magnetite particles have a synthetic organic surfactant strongly adsorbed onto the surfaces of the particles, that is, the surfactant is present at the interfaces of the particles and the liquid dispersion medium. The surfactant is an oil-soluble surfactant and it is oriented so that the hydrocarbon moiety (tail) is oriented outwardly into the oil dispersion medium phase, whereas the polar moiety (head group) is oriented toward the magnetite particle. The surfactant is effective to stabilize the colloidal dispersion so as to retard or prevent flocculation and coagulation of the particles thereof.

The liquid dispersion medium is a water-insoluble non-polar liquid consisting mainly of hydrocarbons, with few polar groups, and having a low dielectric constant.

In the actual preparation of the dispersion according to the present invention, there may be employed some simple processes. First, when the dispersion is the magnetic fluid, it can be prepared by adding at least the ferrous salt, the ferric salt and an aqueous alkali solutions to the solution of the oil-soluble surface active agent (oil solution of the surface active agent). Specifically, fine particles of highly magnetic oxide are produced in this instance by coprecipitating same in an at least three component system comprising the ferrous salt, the ferric salt and aqueous alkali solutions in the water pools within the inverse-micelles formed in the non-aqueous solution of the oil-soluble surface active agent or in the water drops of the W/O type microemulsion or W/O type emulsion. As a matter of course, the fine particles have adsorbed or adhered thereon the oil-soluble surface active agent and take the form of being dispersed in the non-aqueous solution (water-insoluble organic solvent). As the salt-forming moiety of the ferrous salt and ferric salt used herein there can be enumerated sulfate, hydrochloride, nitrate and the like.

The ratio of ferrous salt to ferric salt is preferably in the range of at least 8 or more in view of the largeness or magnetic strength of the oxide (iron oxide) fine particles to be produced. Further, the quantity of alkali added is preferably equivalent or substantially equivalent to the iron salts in order to prevent the formation of a by-product, namely, the alkaline salt of the surface active agent, to the utmost. Still further, the production of the dispersion according to the present invention is carried out while stirring, the stirring velocity being about 2000 to 10,000 rpm.

In the above-mentioned case, there is employed the process (a) which comprises adding the aqueous solutions of the ferrous salt and the ferric salt to the solution of the surface active agent in the oil, and then adding the aqueous alkali solution thereto, thereby forming the highly magnetic oxide (magnetite), which precipitates by virtue of the reaction between those aqueous solutions. In addition thereto, there may be employed the following processes such as the process (b) which comprises mixing the ferrous salt with the ferric salt, dissolving this mixture in water, adding this solution to the oil solution of the surface active agent and further adding the aqueous alkali solution thereto; the process (c) which comprises dissolving the aqueous alkali solution in the oil solution of the surface active agent, adding thereto the ferrous salt aqueous solution (or the ferric salt aqueous solution) and the ferric salt aqueous solution (or the ferrous salt aqueous solution) in sequence; the process (d) which comprises mixing a solution obtained by dissolving the ferrous salt aqueous solution (or the ferric salt aqueous solution) in the oil solution of the surface active agent with a solution obtained by dissolving the ferric salt aqueous solution (or the ferrous salt aqueous solution) in the same or a different oil solution of the surface active agent to thereby form a mixed solution, separately preparing a solution by dissolving the aqueous alkali solution in the same or a different oil solution of the surface active agent, and adding this solution to the above-mentioned mixed solution; and the process (e) which comprises dissolving each of the ferrous salt (or ferric salt) and the aqueous alkali solutions in separate oil solutions of the surface active agent, mixing the thus-obtained solutions and adding the ferric salt (or ferrous salt) aqueous solution to the above mixed solution.

By using any of these processes (b) to (e), there can be formed magnetite precipitates due to the reaction between the aqueous solution of ferrous salt and ferric salt and the alkali.

Preferably, attention should be paid to the kind and quantity of alkali beforehand so that the coprecipitation reaction in these production processes may be carried out at a pH of 9.0 or more. The suitable aqueous alkali solutions used herein include those of sodium hydroxide, potassium hydroxide, sodium carbonate, potassium carbonate, sodium sulfite and the like.

The dispersion (magnetic fluid) obtained by the process of this type is one wherein the highly magnetic oxide (magnetite) containing a slight quantity of water and having the oil-soluble surface active agent adsorbed or adhered thereon has been dispersed in the non-aqueous solvent (water-insoluble organic solvent).

Up to this point, the process for the production of the dispersion of the present invention has been explained by describing the process for the production of magnetic fluid as an example. However, as previously stated, the dispersion of the present invention naturally should not be limited to the magnetic fluid alone. That is, the process of the present invention is applicable to other magnetic particles, pigment particles, dye particles and particles of high molecular weight substances. When applied to other cases, the above-mentioned process for the production of magnetic fluid can be carried out as it is or by varying a part of the process properly.

For instance, when the fine particles are comprised of a high molecular weight substance, there may be cited one applicable process which comprises dissolving a monomer in water, adding this to the oil solution of a surface active agent and adding a polymerization initiator and an aqueous alkali solution thereto while stirring. And, when the fine particles are comprised of a titanium compound, there may be cited one process which comprises hydrolyzing tetraalkyltitanate or titanium tetrachloride in the inverse-micelle formed in the non-aqueous solution of the oil-soluble surface active agent or in the water drops of the W/O type micro-emulsion or W/O type emulsion. It is preferable also in this instance that the molar ratio of water to said tetraalkyltitanate or titanium tetrachloride should be maintained at 1 or more.

In the processes for the production of dispersions explained up to this point, it is desirable that the non-aqueous solution of the oil-soluble surface active agent should have a concentration (namely, the concentration of the oil-soluble surface active agent) higher than the CMC, that is, the Critical Micelle Concentration, of the surface active agent used therein.

It is particularly preferred to prepare the dispersion by forming a multitude of small, aqueous microcores (droplets) dispersed in a non-polar solvent containing an oil-soluble surfactant dissolved therein. Inverted or reversed micelles of the surfactant are formed wherein an aqueous microcore is at the center of each micelle and the diameters of the aqueous microcores are in the range of about 10 to 100 Angstrom units. Similar dispersions can be obtained by using water-in-oil (W/O) reversed microemulsions wherein the aqueous microcores have dimensions of from $10^2$ to $10^4$ Angstrom units. In both cases, the aqueous microcores are surrounded by a layer of molecules of the oil-soluble surfactant.

The solid disperse phase (particles) is obtained by reaction within the aqueous microcores until particles of colloidal dimensions are formed, that is, by a condensation method. The solid disperse phase (particles) is not obtained by reducing coarse particles to colloidal dimensions by means of comminution or peptization. According to the invention, the particles are precipitated in situ in the aqueous microcores, which latter are of substantially uniform small size, and the particles thereby obtained are substantially monodisperse particles. In a typical preferred embodiment of the invention, there is obtained a monodisperse red-black magnetite sol dispersed in benzene or cyclohexane and stabilized by adsorbed bis (2-ethylhexyl)sodium sulfosuccinate (Aerosol OT) or hexaoxyethylene nonylphenyl ether (NP-6). The reaction time for forming the solid disperse phase is very short. When the oil-soluble surfactant also solubilizes an adequate amount of the $FeCl_2$, no agitation of the reaction solution is necessary during the reaction.

The unreacted materials, by-products and excess water separate spontaneously from the solid-in-organic liquid colloidal dispersion product so that no special separation procedures are necessary. The surfactant is adsorbed directly on the particle surface simultaneously with the formation of the particles and, therefore, it is not necessary to transfer the particles from the water phase to the oil phase or to provide a special step of adsorbing the surfactant on the particles.

Typically the $Fe_3O_4$ particles in the dispersion product are monodisperse particles having a substantially uniform diameter in the range of 30–50 Angstrom units. They are superior in dispersibility and dispersions made therefrom are stable for more than 3 years.

Because the fine particles, which are the dispersoids, mostly contain water in the preferred range in the thus-obtained dispersion, according to the present invention, the hydrophilic group of the oil-soluble surface active agent adheres to or is adsorbed on these fine particles rigidly, whereby the oil-soluble surface active agent adheres to or is adsorbed on the fine particles and same are dispersed in the water-insoluble organic solvent.

The dispersion according to the present invention is considered to have a variety of uses. For instance, when the fine particles are magnetic ones, there can be enumerated the uses such as magnetic ink, magnetic paint, sealing agent, medical materials, oil absorbent, separating/recovering agent for non-magnetic metals, fuel control agent and the like. When the fine particle substance is a pigment or a dye, there can be enumerated the uses such as printing ink, coloring agent for rubber or plastics and the like. When the fine particle substance is a high molecular weight substance, it is applicable to the purposes such as coating agent for plastics, glass and the like, paint, printing ink and the like. And, when using the dispersion of the present invention as a surface coating agent for plastics and rubber, it is necessary to add a binder thereto or to coat the dispersoid with a resin before use. When using the dispersion of the present invention as a printing ink, paint or jet ink for use in the electrostatic recording method, it is necessary to add a viscosity control agent thereto before use. Further, when applying this dispersion to use as a wet toner for use in electrophotography (including the electrostatic recording method), it is necessary to add thereto proper quantities of binder and polarity control agent before use. And, when spraying this wet toner and drying, it is also possible to obtain a one-component type dry toner.

EXAMPLES

EXAMPLE 1

A black magnetic fluid with a stable dispersibility was obtained by adding an aqueous solution of ferric chloride and ferrous chloride to an isooctane solution of di(2-ethylhexyl)sodium sulfosuccinate while stirring, and further adding 15N-$NH_4OH$ thereto and mixing them together, the molar ratio of ferric chloride to ferrous chloride to $NH_4OH$ being 1:8:86. The mean particle diameter of the dispersoid in this magnetic field was 150 Å. This magnetic fluid, even when left standing at room temperature for 6 months or more, did not show either aggregation or sedimentation.

EXAMPLE 2

A black magnetic fluid with a stable dispersibility was obtained by dissolving 15N-$NH_4OH$ in an isooctane solution of di(2-ethylhexyl)sodium sulfosuccinate while stirring, and thereafter adding thereto an aqueous solution of ferric chloride ($FeCl_3.6H_2O$) and an aqueous solution of ferrous chloride ($FeCl_2.4H_2O$) in sequence and mixing them together, the molar ratio of ferric chloride to ferrous chloride to $NH_4OH$ being 1:8:86.

The mean particle diameter of the dispersoid in this magnetic fluid was 200 Å. This magnetic fluid, even when left standing at room temperature for 6 months or more, did not show either aggregation or sedimentation.

EXAMPLE 3

A solution obtained by dissolving an aqueous solution of ferric chloride in a cyclohexane solution of di(2-ethylhexyl)sodium sulfosuccinate while stirring and a solution obtained by dissolving an aqueous solution of ferrous chloride in a cyclohexane solution of polyoxyethylenenonylphenyl ether (the number of the ethylene oxide group: 20) while stirring were mixed. On the other hand, a solution was obtained separately by dissolving 15N-NH$_4$OH in a cyclohexane solution of di(2-ethylhexyl)sodium sulfosuccinate while stirring, and then this solution was added to the above mixed solution and mixed together (the molar ratio of ferric chloride to ferrous chloride to NH$_4$OH was 1:8:86). The thus-mixed solution was further mixed reversely with distilled water, and the reaction product NH$_4$Cl was removed to thereby separate the oil phase. Thus, there was obtained a black magnetic fluid containing the cyclohexane as the dispersion medium and being superior in dispersibility.

The dispersoid in this magnetic fluid was confirmed to have a mean particle diameter of 200 Å and to be filterable through a membrane filter with a 0.2 μm-opening diameter. And, this magnetic fluid, even when left standing at room temperature for 6 months or more, did not show either aggregation or sedimentation.

EXAMPLE 4

An aqueous solution of ferric chloride (FeCl$_3$.6H$_2$O) and an aqueous solution of 15N-NH$_4$OH were each added to two separate isooctane solutions of di(2-ethylhexyl)sodium sulfosuccinate while stirring and dissolved, whereby two solutions were prepared. Then, these two solutions were mixed, and thereafter an aqueous solution of ferrous chloride (FeCl$_2$.4H$_2$O) was further added to this mixed solution and mixed with stirring, whereby there was obtained a black magnetic fluid with a stable dispersibility.

The mean particle diameter of the dispersoid in this magnetic fluid was 150 Å. And, this magnetic fluid, even when left standing at room temperature for 6 months or more, did not show either aggregation or sedimentation.

The accompanying drawing is a constitutional diagram illustrating the formation of iron oxide in the preparation of a magnetic fluid according to the above-mentioned process. As is evident from this constitutional diagram, the especially preferable conditions for the formation of Fe$_3$O$_4$ (magnetite) using the process shown in Example 4 consist in that $0 \leq F^{3+}/Fe^{2+}$ (molar ratio) $\leq \frac{1}{4}$ and $PH \geq 9$.

EXAMPLE 5

A liquid was obtained by adding water to a 0.3 mole isooctane solution of Aerosol OT. (an oil-soluble surface active agent produced by Nakarai Kagaku Yakuhin K.K.) and dissolving. This liquid is named Liquid I. The water content of Liquid I was 10.0 moles. On the other hand, a solution was obtained by mixing 0.24 mole of n-butyl orthotitanate monomer with a 0.3 mole isooctane solution of Aerosol OT. This solution is named Liquid II. Liquid II was free of water.

Subsequently, Liquid I and Liquid II were mixed and stirred. Thereafter, this mixed liquid was left standing for 8 hours and then subjected to 5 hours' reflux, thereby forming TiO$_2$. This liquid was further distilled for removing butanol and water. Isooctane was supplied thereto in a quantity corresponding to the reduced quantity of isooctane, and the same was subjected to 30 minutes' ultrasonic wave dispersion, thereby obtaining a dispersion of TiO$_2$.

The dispersoid of this dispersion was observed to have a particle diameter distribution of 200 Å to 1 μm. And, this dispersion, even when left standing at room temperature for 6 months or more, did not show either aggregation or sedimentation.

EXAMPLE 6

A solution was prepared by dissolving 3.0 moles of water in a 0.3 mole isooctane solution of di(2-ethylhexyl)sodium sulfosuccinate. Apart from this, another solution was prepared by dissolving 0.24 mole of n-butyl orthotitanate (monomer) in a 0.3 mole isooctane solution of di(2-ethylhexyl)sodium sulfosuccinate. These two solutions were mixed, stirred and then left standing for 24 hours.

Subsequently, this mixed solution was subjected to reflux and the butanol and water produced by hydrolysis were removed therefrom by distillation.

The residual solution after distillation was added with a proper quantity of isooctane, and the same was subjected to 3 hours' ultrasonic wave radiation, thereby obtaining a white dispersion.

The dispersoid of this dispersion had a mean particle diameter of 300 Å. And, this dispersion, even when left standing at room temperature for 6 months or more, did not show either aggregation or sedimentation.

EXAMPLE 7

A 0.1 mole aqueous solution of acrylamide monomer was dissolved in a 0.3 mole isooctane solution of di(2-ethylhexyl)sodium sulfosuccinate with stirring until the water concentration became 3.6 moles. A 0.1 wt. % isooctane solution of azoisobutyronitrile was mixed therewith and stirred, thereby obtaining a polyacrylamide dispersion having a mean particle diameter of 200 Å.

This dispersion, even when left standing at room temperature for 6 months or more, did not show either aggregation or sedimentation.

EXAMPLES 8 THROUGH 17

In each of these Examples, there were used three kinds of reaction liquids which were mixed together to obtain a colloidal dispersion of Fe$_3$O$_4$ particles in the dispersion medium. The combination of surfactant/dispersion mediums used to obtain the respective reaction liquids each contained 0.3 mol/kg of the surfactant. The respective reaction liquids were obtained by adding the indicated amount of the reactant to 3 ml of the surfactant/dispersion medium liquid containing 0.3 mol/kg of the surfactant.

For example, in Example No. 8, 0.1 ml of 1.4M FeCl$_3$ aqueous solution was added 3 ml of the AOT/C$_6$H$_{12}$ surfactant/dispersion medium solution containing 0.3 mol/kg of AOT, whereby to obtain a first reaction liquid. In like fashion, second and third reaction liquids were obtained by adding 0.5 ml of 1.4M FeCl$_2$ aqueous solution and 0.4 ml of 15NH$_2$OH, respectively, to separate samples of AOT/C$_6$H$_{12}$. Then the three reaction liquids were mixed together. The particles obtained were spherical having diameters in the range of 30–50 Angstrom units. They were uniform in particle size.

TABLE AND FOOTNOTES

| Example No. | Reactants | | | Product | |
|---|---|---|---|---|---|
| | 0.1 ml 1.4 M-ferric chloride | 0.5 ml 1.4 M-ferrous chloride | 0.4 ml 15 N—NH$_4$OH | | |
| | | Each mixed with 3 ml of the following Surfactant/Dispersion Medium Combinations containing 0.3 mol/kg of surfactant | | Fe$_3$O$_4$ Particle Shape | Dispersibility |
| 8 | AOT/C$_6$H$_{12}$ | MGO/C$_6$H$_{12}$ | MGO/C$_6$H$_{12}$ | Spherical and monodisperse | good |
| 9 | AOT/C$_6$H$_{12}$ | MGO/C$_6$H$_{12}$ | AOT/C$_6$H$_{12}$ | " | good |
| 10 | MGO/C$_6$H$_{12}$ | MGO/C$_6$H$_{12}$ | MGO/C$_6$H$_{12}$ | " | good |
| 11 | AOT/C$_6$H$_6$ | MGO/C$_6$H$_6$ | AOT/C$_6$H$_6$ | " | good |
| 12 | AOT/C$_6$H$_{12}$ | MYS/C$_6$H$_6$ | MYS/C$_6$H$_6$ | " | good |
| 13 | AOT/C$_6$H$_{12}$ | MYS/C$_6$H$_6$ | MYS/C$_6$H$_6$ | " | good |
| 14 | DAP/C$_6$H$_6$ | MGO/C$_6$H$_{12}$ | MGO/C$_6$H$_{12}$ | " | good |
| 15 | BDDAB/C$_6$H$_{12}$ | MGO/C$_6$H$_{12}$ | MGO/C$_6$H$_{12}$ | " | good |
| 16 | BDDAB/C$_6$H$_5$Cl | NP-6/C$_6$H$_{12}$ | NP-6/C$_6$H$_{12}$ | " | good |
| 17 | NaDNNS/C$_6$H$_{12}$ | NP-6/C$_6$H$_{12}$ | NaDNNS/C$_6$H$_{12}$ | " | good |

Notes:

NP-6: 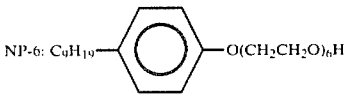

AOT: Aerosol OT

MGO: 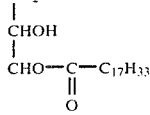

MYS: $C_{17}H_{35}$—C—O(CH$_2$CH$_2$O)$_{10}$H

BL-8: $C_{12}H_{25}$O(CH$_2$CH$_2$O)$_8$H

DAP: $C_{12}H_{25}$NH$_3$OOCC$_2$H$_5$

BDDAB: $C_{12}H_{25}$·C$_4$H$_9$N(CH$_3$)$_2$Br

NaDNNS: 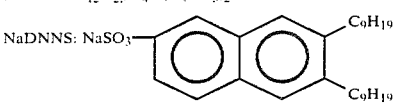

We claim:

1. A process for preparing a dispersion comprising finely divided particles of a first magnetic solid dispersed in a continuous phase of a water-insoluble organic solvent, comprising the steps of (A) dispersing (a) the components of an aqueous reaction mixture capable of reacting to form said first magnetic solid and containing water therein, in (b) a liquid comprised of a solution of an oil-soluble surface active agent in said water-insoluble organic solvent, and forming a dispersed system of two immiscible liquid phases wherein the continuous phase is said liquid (b) and the disperse phase is finely divided droplets of said aqueous reaction mixture; and (B) effecting the reaction of the components of said aqueous reaction mixture, in situ in said dispersed system, to transform said droplets into finely divided particles of said first magnetic solid, said oil-soluble surface active agent being adhered to or adsorbed on said finely divided particles and being effective to disperse them in said water-insoluble organic solvent.

2. A process for preparing a dispersion comprising finely divided particles of Fe$_3$O$_4$ dispersed in a continuous phase of a water-insoluble non-polar organic solvent, comprising the steps of dispersing (a) a water-soluble ferrous salt, a water-soluble ferric salt, a water-soluble alkali and water to form an aqueous reaction mixture capable of reacting to form finely divided solid Fe$_3$O$_4$ particles in (b) a liquid consisting essentially of a solution of an oil-soluble surface active agent in said water-insoluble non-polar organic solvent in which liquid the concentration of said oil-soluble surface active agent in said water-insoluble organic solvent is higher than the critical micelle concentration thereof, and thereby forming a dispersed system consisting essentially of two immiscible liquid phases wherein the continuous phase is said liquid (b) and the disperse phase is finely divided droplets of said aqueous reaction mixture; effecting the reaction of the components of said aqueous reaction mixture, in situ in said dispersed system, to transform said droplets into finely divided solid particles of Fe$_3$O$_4$, said oil-soluble surface active agent being adhered to or adsorbed on said finely divided solid particles of Fe$_3$O$_4$ and being effective to disperse them in said water-insoluble organic solvent.

3. A process as claimed in claim 1 in which said finely divided particles of said first solid contain from 1 to 50 moles of water per mole of said oil-soluble surface active agent.

4. A process as claimed in claim 2 in which said finely divided Fe$_3$O$_4$ particles contain from 1 to 50 moles of water per mole of said oil-soluble surface active agent.

5. A process as claimed in claim 1 in which said particles have a particle diameter of 1000 Å or less.

6. A process as claimed in claim 1 in which said particles have a particle diameter of 300 Å or less.

* * * * *